United States Patent
Daynes et al.

(10) Patent No.: US 7,003,768 B2
(45) Date of Patent: Feb. 21, 2006

(54) METHOD AND APPARATUS FOR CLASS INTIALIZATION BARRIERS AND ACCESS TO CLASS VARIABLES IN MULTITASKING VIRTUAL MACHINES

(75) Inventors: Laurent P. Daynes, Sunnyvale, CA (US); Grzegorz J. Czajkowski, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 931 days.

(21) Appl. No.: 09/975,145

(22) Filed: Oct. 9, 2001

(65) Prior Publication Data

US 2002/0133527 A1  Sep. 19, 2002

Related U.S. Application Data

(60) Provisional application No. 60/276,049, filed on Mar. 15, 2001.

(51) Int. Cl.
*G06F 9/455* (2006.01)
*G06F 9/46* (2006.01)

(52) U.S. Cl. ............................................ 718/1; 718/107

(58) Field of Classification Search .................. 718/1, 718/100–108
See application file for complete search history.

(56) References Cited

U.S. PATENT DOCUMENTS

| 5,414,848 | A | * | 5/1995 | Sandage et al. | ............ 718/107 |
| 6,374,286 | B1 | * | 4/2002 | Gee et al. | .................. 718/108 |

* cited by examiner

*Primary Examiner*—Meng-Al T. An
*Assistant Examiner*—Kenneth Tang
(74) *Attorney, Agent, or Firm*—Park, Vaughan & Fleming, LLP; Edward J. Grundler

(57) ABSTRACT

One embodiment of the present invention provides a system for efficient class initialization barrier and access to class information private to a task that enables sharing between multiple tasks/virtual machines of both interpreted platform-independent code and the equivalent native code produced at runtime, wherein a class initialization barrier guarantees that a task initializes a class before the class is first used by the program executed by the task. The system operates by associating the shared runtime representation of classes with tables of pointers to task class mirror objects that hold the task private representation of a class. Entries of task class mirror tables are used both as a mean to encode the initialization status of the associated class for a plurality of tasks, and to provide access to the task private representation of a class loaded by a task irrespectively of the initialization state of the class for this task.

42 Claims, 4 Drawing Sheets

METHOD AND APPARATUS FOR CLASS INTIALIZATION BARRIERS AND ACCESS TO CLASS VARIABLES IN MULTITASKING VIRTUAL MACHINES

RELATED APPLICATION

This application hereby claims priority under 35 U.S.C. §119 to a Provisional Patent Application entitled, "The Design of MVM—a Multitasking Virtual Machine," filed Mar. 15, 2001 by inventors Grzegorz J. Czajkowski and Laurent P. Daynes (application Ser. No. 60/276,409).

The subject matter of this application is related to the subject matter in a co-pending non-provisional application by the same inventors as the instant application and filed on the same day as the instant application entitled, "Method and Apparatus to Facilitate Sharing Instruction Code in a Multitasking Virtual Machine," having Ser. No. 10/043,801, and filing date Jan. 10, 2002.

BACKGROUND

1. Field of the Invention

The present invention relates to computer instruction code. More specifically, the present invention relates to a method and an apparatus for a class initialization barrier in a multitasking virtual machine.

2. Related Art

Computer programs written in languages such as JAVA™ are compiled into a platform-independent code, which is executed on a virtual machine, such as a JAVA VIRTUAL MACHINE (JVM). A program that has been compiled into a platform-independent code has the advantage that it can execute on a virtual machine regardless of the underlying central processing unit and native code. The terms JAVA, JVM, and JAVA VIRTUAL MACHINE are trademarks or registered trademarks of SUN Microsystems, Inc. of Palo Alto, Calif.

A virtual machine typically includes an interpreter, which interprets the platform-independent code into native code to perform the desired operations. Interpreting the platform-independent code is an inherently slow operation. Therefore, many virtual machine implementations also include a dynamic compiler, which can compile at runtime the platform-independent code into the native code of the machine being used to host the virtual machine. Compiling the platform-independent code into the native code of the host machine can reduce the execution time of the program and, therefore, increase throughput.

Virtual machines for object-oriented programming languages with dynamic class loading typically load the code of a class when a program resolves a symbolic reference to that class for the first time. The class needs to be initialized subsequently when the program uses it for the first time. Loading and initialization of a class are two separate events. Initialization of a class may never take place even though the class has been loaded before. In the case of the Java programming language, the initialization of a class consists of executing some code, known as the class's static initializer, that brings the class's variables (also known as the static variables) to a well-defined initialized state. A virtual machine implementation may choose to set a class to the initialized state upon its loading when no action is required to initialize that class. For instance, in the Java programming language, no action is required to initialize a class when this class has no declared static initialization sequence, and either no non-final static variables, or non-final static variables that are all declared to be set to a default value. In this case, a virtual machine implementation can benefit from setting such initialization-less classes to the initialized state upon class loading.

A class initialization barrier is a sequence of native instructions that calls the virtual machine's runtime to initialize a class if it is not already initialized. Class initialization barriers are included in the implementation of those platform-independent instructions that may result in the very first use of a class (in the case of the Java programming language, there are 4 such instructions: getstatic, putstatic, invokestatic, new). The implementation of a platform-independent instruction can come in two flavors: (i) as a sequence of instruction that is part of the implementation of an interpreter of platform-independent instructions, (ii) or as a sequence of instruction generated by a dynamic compiler of platform-independent instructions.

Because class initialization barriers need only to be executed once per class, it is common practice in the implementation of non-multitasking virtual machines to have recourse to code-rewriting techniques to remove them and the overhead they induce. In other words, a class initialization barrier can simply be an instruction that calls the virtual machine runtime and that is removed, or replaced, by the runtime before returning from the call site.

A multitasking virtual machine (MVM) introduces further complication to these mechanisms. In order to save processing and memory, an MVM aims at sharing as much of the runtime representation of a class as possible between tasks. Targets for sharing include the platform-independent code, the meta-data describing the class, and the native code produced by the dynamic compiler. Code re-writing techniques can be harmful when code, whether it is platform-independent or produced by a runtime compiler, is shared between multiple tasks. For instance, rewriting native code to remove a class initialization barrier is incorrect when that code is shared between multiple tasks, since tasks that have not initialized the corresponding class may subsequently be given access to that class without it being initialized first.

Furthermore, part of the runtime representation of a class cannot be shared among tasks, in particular, the storage for the class's variables, the initialization state of the class for a given task, or the objects used in the first-class representation of the class (e.g., in the Java programming language, an instance of java.lang.Class).

It is the role of the multitasking virtual machine to efficiently implement the level of indirection needed to access the task-specific part of classes, most prominently, the storage for classes' variables, that correspond to the task on behalf of which code is being executed.

Hence, there is a need for a method and apparatus for an efficient class initialization barrier that enables sharing between multiple tasks/virtual machines of both interpreted platform-independent code and the equivalent native code produced at runtime. Because access to the global variables of classes can be frequent, and because such access must take place only if a class is initialized, class initialization barriers must also be made efficient for the case of class's variable access. Lastly, accesses to a class's variable in cases where it is known that the class is already initialized, or being initialized, should not pay any costs related to the class barrier mechanism.

SUMMARY

A multitasking virtual machine associates each shared representation of a class with a table of references to task class mirror objects, plus one task class mirror object per task using that class (i.e., per task having at least loaded that class). A task class mirror object holds information that cannot be shared between tasks, including a status of the class initialization state for the corresponding task.

In one embodiment of the present invention, each task class mirror table includes two task class mirror object pointers per task, stored at entries called the initialized and the resolved entries. The values of these two entries encode the status of the class with respect to class resolution and initialization by the corresponding task.

Two possible arrangements of initialized and resolved entries for a given task are favored. In the first arrangement, the initialized and the resolved entries are stored at consecutive position in the table, so that the position of one entry for a given task can simply be computed from the other by adding or subtracting 1. In the second arrangement, all the initialized entries are stored contiguously, followed by all the resolved entries, so that the position of one entry for a given task can simply be computed from the other by adding or subtracting the number of tasks supported by the table (or, by adding half of the total number of entries).

In one embodiment of the present invention, the task class mirror table of initialization-less classes (as defined in [0006]) can be made of a single task class mirror object pointer per-task, in order to minimize the space consumed by task class mirror tables. When a virtual machine uses this space-saving technique, referred hereafter as the initialization-less optimization, it must use the second arrangement of initialized and resolved entry described in [0013] for the task class mirror table of non-initialization-less classes.

In one embodiment of the present invention, the system indexes the task class mirror table using a task identifier. To reduce the number of CPU cycle spent to execute class initialization barrier, an encoding of the identifier of a task as an offset from the beginning of a class task mirror table to the initialized entry associated with that task is stored in the descriptor of every thread running on behalf of that task.

In one embodiment of the present invention, the system initializes all the entries of the task class mirror table of a class to a null pointer upon creation of the shared representation of the class.

In one embodiment of the present invention, upon loading of class C by a task T the system sets a resolved entry of the task class mirror table associated with C to the task class mirror object that holds the representation of C that is private to T. The index to the resolved entry is computed from T's identifier. If the class C is identified initialization-less during class loading and the multi-tasking virtual machine implementation uses the initialization-less optimization, the task class mirror is set to the initialized state, and its pointer is stored at the entry corresponding to T in the task class mirror table associated with C.

In one embodiment of the present invention, the system examines the initialized entry of a task class mirror table associated with a class C, at the index that corresponds to a task T, in order to determine if T has initialized C. A null reference at that initialized entry indicates that T has not initialized C, and the system proceeds to the initialization of C by T.

In one embodiment of the present invention, upon completion of the initialization of a class C by a task T, the system sets an initialized entry of the task class mirror table associated with C to the task class mirror object that holds the representation of C that is private to T. The index to the initialized entry is computed from T's identifier.

In one embodiment of the present invention, the resolved entry of a task class mirror table is used in cases where testing for class initialization is unneeded but access to the task private part of a class is required (for example, in the case of the Java programming language, accesses to the static variables of a class don't need to be preceded with a class initialization barrier when executing the static initializer or any method of that class; also, the dynamic compiler of the multitasking virtual machine may determine, using some code analysis, that a class initialization barrier is unnecessary when accessing a static variable of that class).

BRIEF DESCRIPTION OF THE FIGURES

FIG. 3A illustrates task class mirror table 302 associated with the shared representation of a class C in accordance with an embodiment of the present invention.

FIG. 3B illustrates task class mirror table 302 after initialization of class C by a task in accordance with an embodiment of the present invention.

FIG. 3C illustrates an alternate implementation of task class mirror table 302 associated with the shared representation of a class C in accordance with an embodiment of the present invention.

FIG. 3D illustrates an alternate implementation of task class mirror table 302 after initialization of class C by a task in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Device

Figure 1:
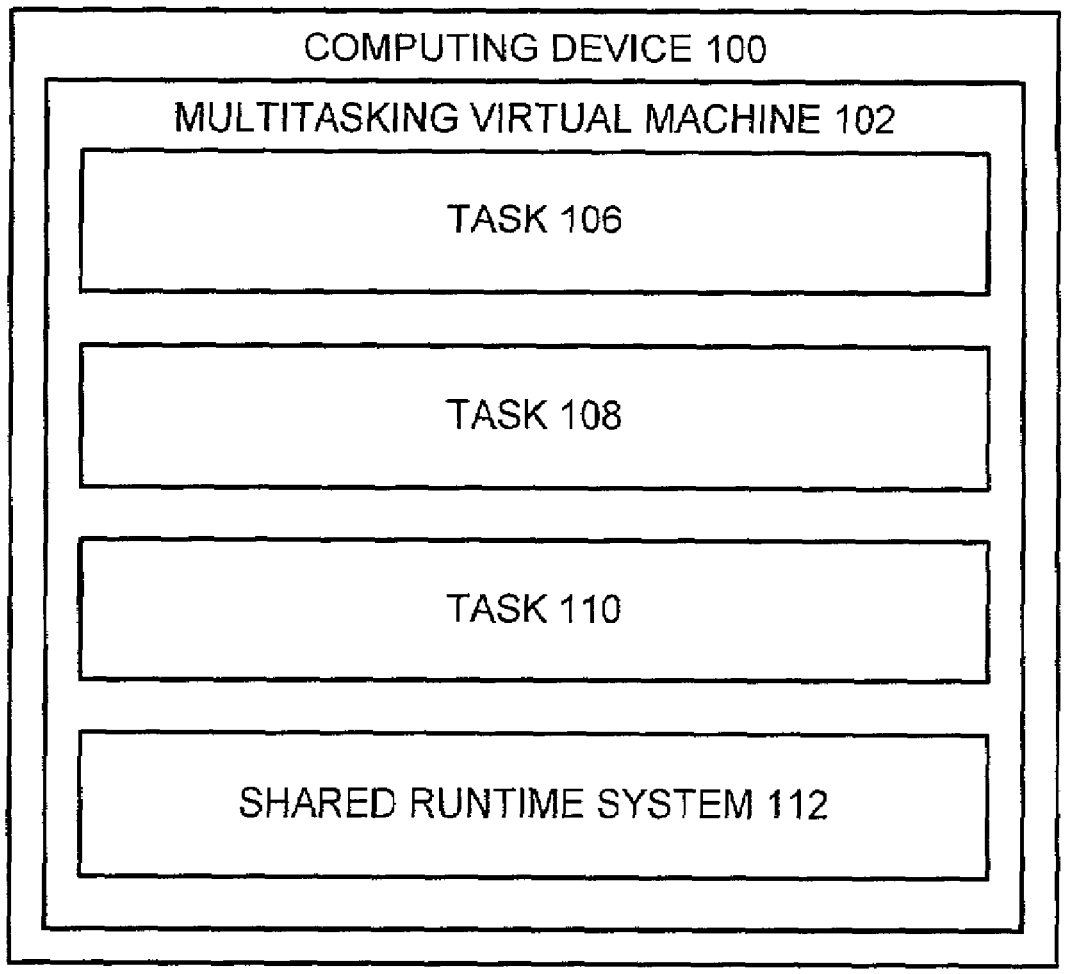
FIG. 1 illustrates computing device 100 in accordance with an embodiment of the present invention.

FIG. 1 illustrates computing device 100 in accordance with an embodiment of the present invention. Computing device 100 can generally include any type of computer system, including, but not limited to, a computer system based on a microprocessor, a mainframe computer, a digital signal processor, a portable computing device, a personal organizer, a device controller, and a computational engine within an appliance. Computing device 100 includes multitasking virtual machine 102.

Multitasking virtual machine 102 executes platform-independent code on behalf of multiple tasks such that each task is provided with the illusion that it is the only task being executed. Multitasking virtual machine 102 includes tasks 106, 108, and 110 and shared runtime system 112. Note that multitasking virtual machine 102 can include more or less tasks than shown and described herein. Tasks 106, 108, and 110 and shared runtime system 112 cooperate to execute tasks 106, 108, and 110 as described below in conjunction with FIG. 2.

Multitasking Virtual Machine

Figure 2:
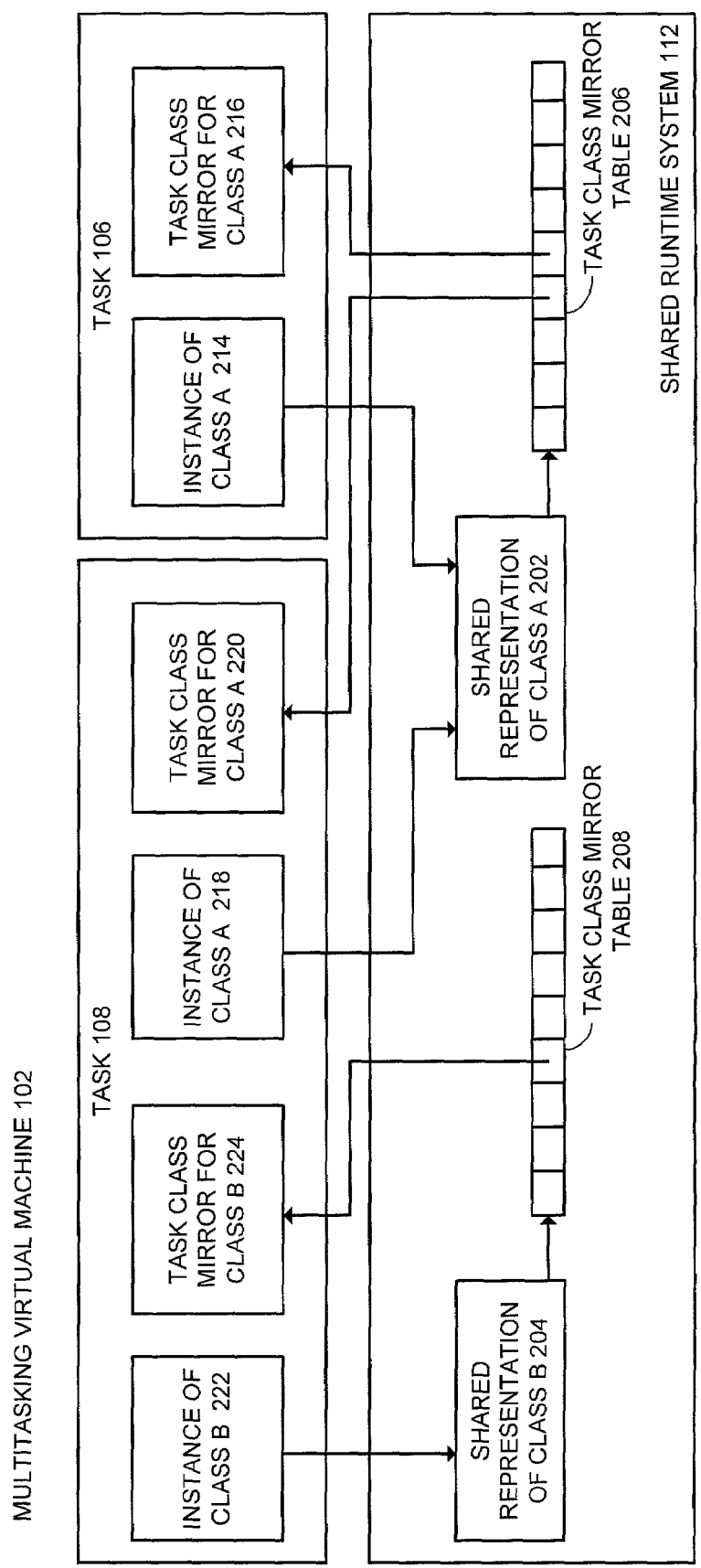
FIG. 2 illustrates a typical design of a running multitasking virtual machine 102 in accordance with an embodiment of the present invention.

FIG. 2 illustrates a typical design of a running multitasking virtual machine 102 in accordance with an embodiment of the present invention. In FIG. 2, multitasking virtual machine 102 includes tasks 106 and 108 and shared runtime system 112. Shared runtime system 112 includes shared representation of class A 202, shared representation of class B 204, and task class mirror tables 206 and 208. In general, the portion of runtime system 112 that is shared among all tasks includes a shared representation of every loaded class, along with the associated task class mirror table.

Shared representation of class A 202, and shared representation of class B 204 include code (platform-independent code, and possibly, equivalent native code produced by the dynamic compiler of the virtual machine) and data (e.g., description of fields of instance and class variables, methods, interfaces, literal constants, symbolic links to other classes, etc.), which can be shared among any task requiring classes A and B. Task class mirror tables 206 and 208 are tables of pointers to task class mirrors for the respective classes. A task class mirror includes information for a class, which cannot be shared with other tasks as described below and in conjunction with FIG. 3. Task class mirror tables serve both as a multiplexing mechanism to retrieve the task class mirror of a class specific to a task, and a method for encoding the per-task initialization status of a class that enables fast implementation of class initialization barriers.

Data of a class that is specific to a task is stored in a task class mirror object, e.g., data of class A for task 106, respectively task 108, is stored in task class mirror 216, respectively, task class mirror 220. Example of class data that is specific to a class includes:
- the class own variables (e.g., the static variables of the class in the Java programming language),
- the class's initialization state,
- a reference to an object representing the class for programs (e.g., an instance of the class java.lang.Class in the case of the Java programming language).

The references to the task class mirror objects of a class (e.g., task class mirror object 216 and 220) are stored in the task class mirror table associated with the shared representation of that class (e.g., task class mirror table 206 of shared representation of class A 202).

Each task is assigned a unique identifier by multitasking virtual machine 102. This unique identifier is used to compute an index to the task class mirror table of any shared representation of a class and obtain the corresponding task class mirror for that task. For example, the unique identifier of task 108 can be used to compute an index to task class mirror table 206 (respectively, task class mirror table 208) and obtain task class mirror 220 (respectively, task class mirror 224) that holds class A (respectively, class B) data that are specific to task 108.

Task Class Mirror Table

FIG. 3A illustrates task class mirror table 302 associated with the shared representation of a class C, before C's initialization but after its loading. Task class mirror table 302 is created when the shared representation of C is created, which happens typically upon the first request to load class C from any task. Task class mirror table 302 includes two entries per task, called respectively the resolved entry and the initialized entry. The present invention favors an arrangement where the entries assigned to a task are next to each other, so that the location of one entry can be simply found from the location of the other. Each entry holds the value of a pointer to a task class mirror object. All the entries of the task class mirror table are initialized to null upon its creation. Task class mirror table 302 includes sufficient entries to accommodate the expected number of tasks, however, the size of task class mirror table 302 can be dynamically adjusted during operation.

Upon loading of class C by a task, a task class mirror 304 is created and a pointer 306 to it is stored in the resolved entry of the task class mirror table 302. The initialized entry is left set to the null value. This configuration of the entries for a given task indicates that the task has loaded the class but has not initialized it yet.

FIG. 3B illustrates task class mirror table 302 after initialization in accordance with an embodiment of the present invention. A class initialization barrier determines if a class has been initialized for a specific task by examining the initialized entry of the class's task class mirror table for this task, as described above. If the pointer at that entry is null, multitasking virtual machine calls some runtime function that initializes the class on behalf of the task. Synchronizations against concurrent initializations of the same class by multiple threads of the same task are needed only in the runtime function that performs the actual initialization of the class, not in the barrier itself. The initialization completes by setting the initialized entry of task class mirror table 302 to a pointer 308 to the task class mirror 304 for this task. This prevents subsequent executions of the class initialization barrier by the task from calling multitasking virtual machine 102's runtime to initialize the class.

Figure 3E:
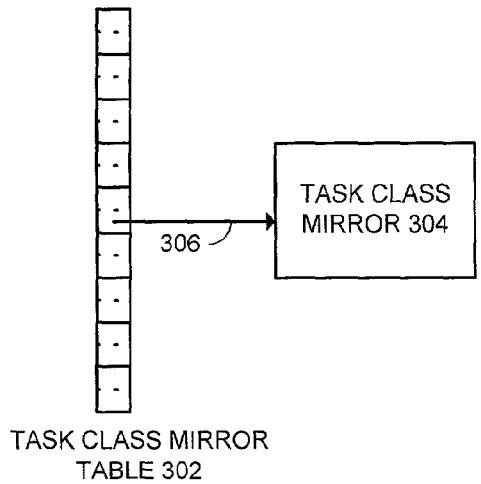
FIG. 3E illustrates task class mirror table 310 associated with the shared representation of an initialization-less class C in accordance with an embodiment of the present invention.
Figure 3E:
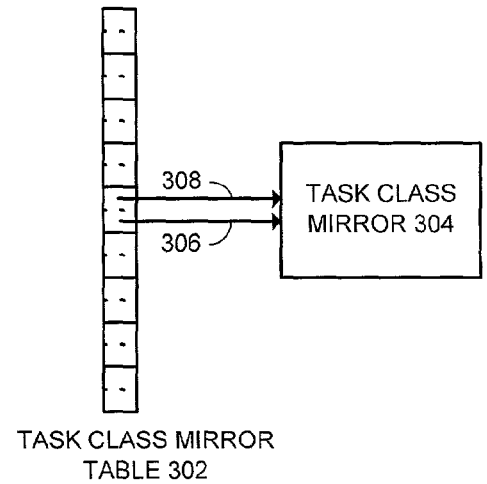
Figure 3E:
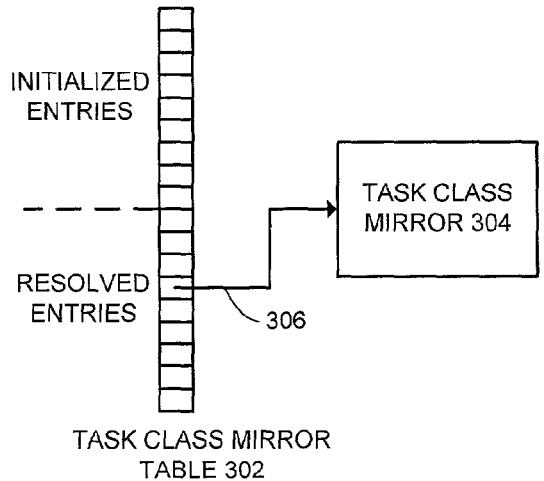
Figure 3E:
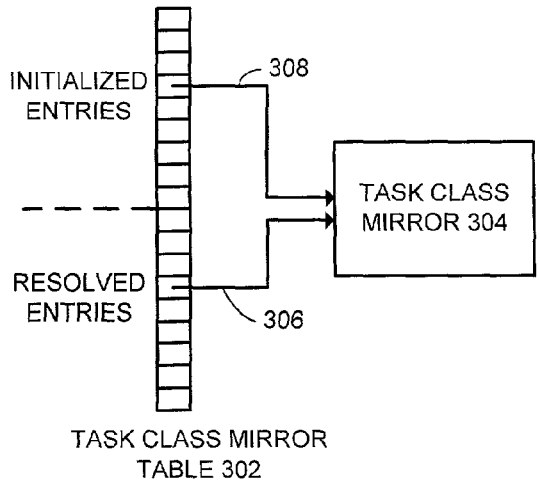
Figure 3E:
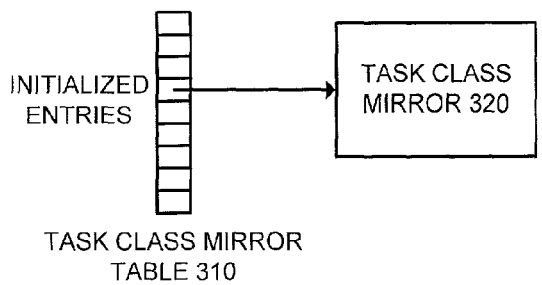

FIG. 3E shows the task class mirror table associated with the shared representation of a initialization-less class C when the multitasking virtual machine implementation treat them specially so as to minimize space consumption. In this case, the table has only one entry per task, and the entry is set upon loading of class C by the corresponding task. Classes that require initialization are dealt with as previously described, except a different arrangement of the entries of a task class mirror table must used, as shown on FIG. 3C and FIG. 3D. In other words, the only difference with the mechanisms described in [0037] to [0039] is the location in the task class mirror table of the initialized and resolved entries for a given task.

Initialization

Figure 4:
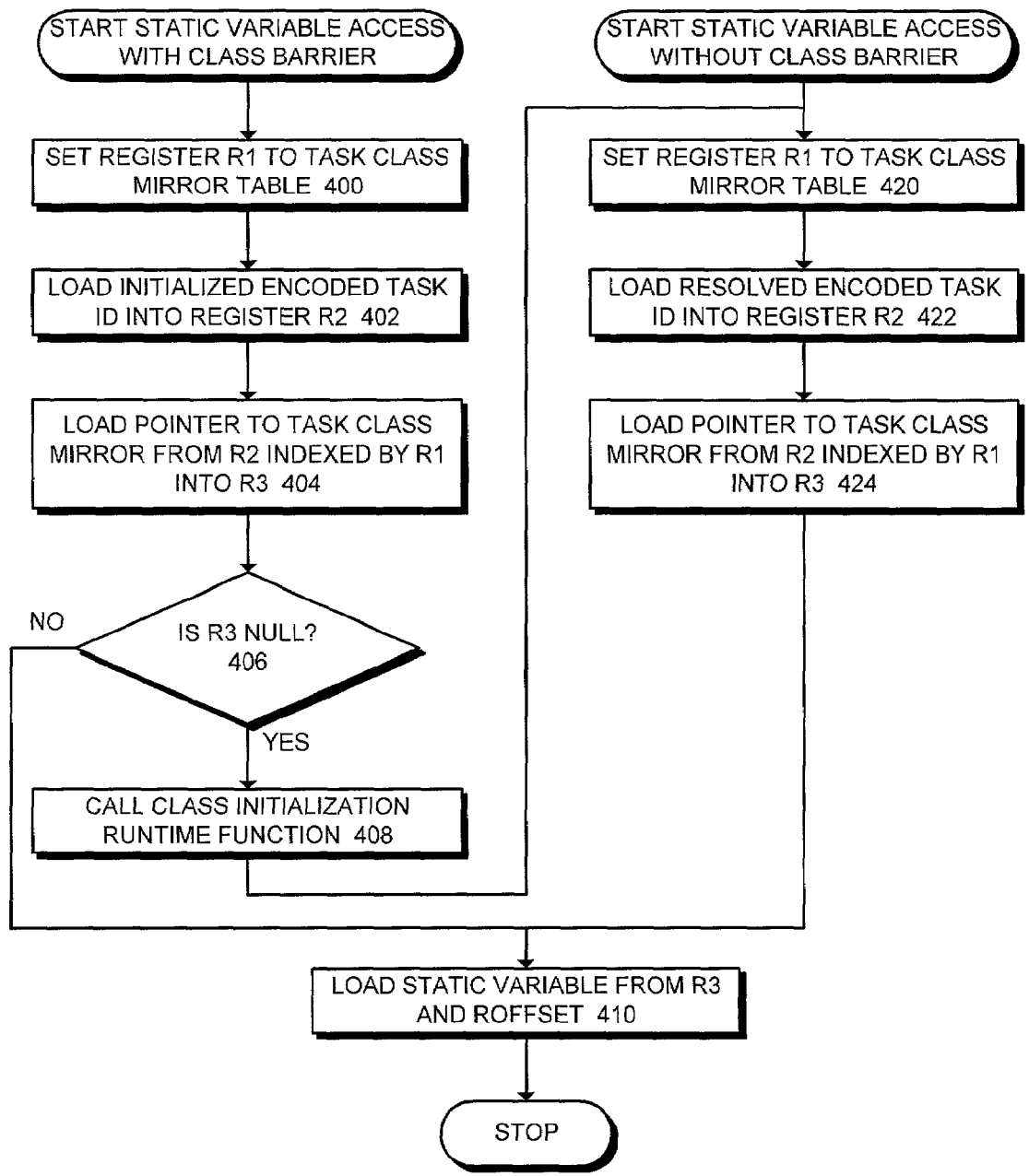
FIG. 4 is a flowchart illustrating how a multitasking virtual machine implement access to a global variable of a class by one task in accordance with one embodiment of the present invention.

FIG. 4 is a flowchart illustrating how a multitasking virtual machine implements access to a global variable of a class by one task in accordance with one embodiment of the present invention. FIG. 4 describes two types of access to a global variable of a class: accesses guarded by a class initialization barrier, and unguarded accesses. Guarded accesses are used in the implementation of the interpreter of the multitasking virtual machine, and are generated by its dynamic compiler. Unguarded accesses are typically generated by the dynamic compiler of a multitasking virtual machine, when the dynamic compiler determines through some analysis that a class initialization barrier is unnecessary. In both cases of access, the flowchart assumes that the offset to the static variable being accessed is already set in a register Roffset.

A guarded class variable access starts with setting a register to the address of the task class mirror table associated with the class whose variable is being accessed (step 400). It then fetches the encoded identifier of the current task from the current thread's descriptor, which is typically bound to a specific register (step 402). The value of the encoded identifier is an offset from the beginning of the task class mirror table to the initialized entry associated with the current task. The registers set by the two previous steps are then used to load a pointer to a task class mirror object into a register R3 (step 404), the value of which is tested (step 406). A non-null pointer value indicates that the class has been initialized, and control is transferred to code that load the class variable (step 410).

A null pointer value in R3 indicates that the class whose variable is being accessed has not been initialized yet, and control is transferred (step 406) to code that calls a runtime function (step 408) that performs the initialization of the class, if needed. The runtime function synchronizes all the threads of the current task so that only one of them, called the initializer thread, executes the class initialization code. While executing the class initialization code, the initializer thread may execute further guarded accesses to the variables of the class being initialized. These guarded accesses too result in a call to the runtime function, since the initialized entry in the task class mirror table is still set to null. Any call to the runtime from a guarded access to a variable of a class C that is already being initialized, and issued by the initializer thread of C, will return immediately without further action. However, because the initialized entry is still set to null, the initializer thread cannot use it to access the class's variable. Instead, upon return from the call to the runtime at step 408, execution continues as for an unguarded class variable access (steps 420, 422, 424, 410). An equivalent alternative to this solution is to have the runtime function at step 408 returning the pointer to the task class mirror object and to proceed directly to step 410.

An unguarded class variable access starts with setting a register to the address of the task class mirror table associated with the class whose variable is being accessed (step 420). It then fetches the encoded identifier of the current task from the current thread's descriptor, which is typically bound to a specific register (step 422). The value of the encoded identifier is an offset from the beginning of the task class mirror table to the resolved entry associated with the current task. The registers set by the two previous steps are then used to load a pointer to a task class mirror object into a register R3 (step 424), which is then used to load the desired class variable (step 410). Multiple variants of this mechanism are possible. For instance, it is possible to compute the offset to the resolved entry from the offset to the initialized entry (as described in [0054]) instead of storing the former in thread descriptors.

If the implementation of the multitasking virtual machine treats initialization-less classes specially in order to optimize space consumed by task class mirror table, all accesses to the variables of an initialization-less class can be unguarded. However, unguarded accesses in this case differ from the description given FIG. 4 as follows: step 422 should load the initialized encoded task identifier (as in 402) instead of the resolved one, since task class mirror tables associated with initialization-less classes does not have any resolved entries. Note also that guarded accesses, as described on FIG. 4, to the static variables of an initialization-less class always works, since in this case the register R3 will never be null. Guarded access to initialization-less classes is however sub-optimal and shouldn't be used if the multitasking virtual machine implementation adopt the special task class mirror table arrangement for initialization-less classes.

The following illustrates in detail how the class initialization barrier and static variable access mechanisms described above can be implemented on a particular processor, namely, SPARC v9. SPARC is a trademark or registered trademark of SPARC International, Inc. A guarded access to a static variable is typically implemented with the following sequence of instructions:

1. ld [gthread+encoded_task_id], initialized_entry_offset
2. ld [tcm_table+initialized_entry_offset], tcm
3. brnz, pt, a, tcm end_barrier
4. ld [tcm+static_var_offset], tmp
5. call task_class_initialization_stub
6. nop
7. ld [tcm+static_var_offset], tmp
8. end_barrier:

Instruction 1 fetches a unique internal task identifier from the current thread data structure (whose pointer is permanently allocated to a register). This task identifier is encoded as an offset from the beginning of a task class mirror table to the initialized entry that is assigned to that task. Instruction 2 fetches the address of the task class mirror from the task class mirror table. A null pointer at this location indicates that the class has not yet been initialized by the current task.

Instruction 3 branches to the label "end_barrier" if there is a non-null pointer in the task class mirror table, therefore bypassing the call to the initialization code. Instruction 4 is executed in the delay slot of the branch at instruction 3 only if the branch is taken (delay slot is annulled otherwise). Instruction 4 loads the static variable from the task class mirror object (the offset to the static variable has typically been set before the class barrier in a register, here the static_var_offset register).

If the pointer loaded by instruction 2 is null, the branch at instruction 3 is not taken and execution falls through to instruction 5.

Note that instruction 3 is a branch on register value, a common instruction in RISC processors. This type of branch instruction is favored in the implementation of the barrier over more conventional branch on condition instructions since it eliminates the need for an extra comparison instruction. Instruction 5 calls a stub to a runtime function that initializes the class for the task executing this barrier. The stub takes care of setting the register "tcm" to the task class mirror of the initialized class upon returns, so that instruction 7 can load the static variable. After the end_barrier label, the tmp register holds the static variable value.

Instructions 4 and 7 can be replaced with a store instruction if the barrier sequence implements an assignment to a static variable, i.e.: st tmp, [tcm+static_var_offset], where the register tmp holds the value assigned to the static variable.

If the barrier is not for a static variable access, then instruction 4 can be replaced with a "no operation" (nop)

instruction and instruction 7 can be removed, or both 4 and 7 can be replace with a useful instruction.

The invention also provides with fast access to the task class mirror of a class for a given task when class initialization tests can be omitted (for instance, access to a variable of a class from its class initialization code can avoid a class initialization barrier while leaving the initialized entry set to null). In this case, access to the task class mirror is provided by the resolved entry associated with the task in the task class mirror table. This entry is set to the task class mirror at class load time. The following code illustrates how access to the class time mirror is provided in this case:

1 ld [gthread+encoded_task_id], initialized entry offset
2 add tcm_table, TCM_POINTER_SIZE, tcm_table
3 ld [tcm_table+initialized_entry_offset], tcm
4 ld [tcm+static_var_offset]

As before, instruction 1 fetches the current task's unique internal task identifier encoded as an offset to the initialized entry assigned to that task. Instruction 2 adds the size of a task class mirror pointer to the pointer to the task class mirror table so that adding the initialized entry's offset to it will actually give the address of the resolved entry (since this one is located immediately after the initialized one). This strategy avoids storing another encoded task id in the thread descriptor if space consumption is a concern. Alternatively, it is possible to eliminate instruction 2 by storing also in the thread descriptor a second encoded task identifier whose value is an offset to the resolved entry assigned to the task. Instruction 3 fetches the task class mirror, and instruction 4 loads the desired class variable.

The class initialization barrier and static variable access mechanisms described above ([0047] to [0055]) can be simply modified to also take into account multitasking virtual machine implementations that treat initialization-less classes specially in order to minimize the space consumed by task class mirror tables, as described earlier in [0015]. With this approach, an initialization-less class is associated with a task class mirror table that includes only one entry per task. This entry is set upon loading of the initialization-less class by the corresponding task. Classes that require initialization are, as described before, associated with a task class mirror table that includes two entries per task. However, as noted earlier ([0015]), the entries in the class must be arranged such that all the initialized entries are placed contiguously in the table, followed by all the resolved entries. This arrangement enables the encoding of a task identifier into an offset to an initialized entry of a task table to be used without change for both initialization-less classes and classes that require initialization. A dynamic compiler does not generate any class initialization barrier for initialization-less classes, but must nevertheless generate the level of indirection necessary to access a task's copy of the variables of a class. The code generated in this case consists of only Instructions 1, 2 and 7 of the sequence of instructions described in [0047]. It may not always be possible to eliminate the class barrier for initialization-less classes (e.g., the implementation of an interpreter may only use the generic version of static variable access in order to reduce the number of platform-independent instructions used at runtime), in which case, the sequence described in [0047] works as well, even for initialization-less classes, although it is sub-optimal (for initialization-less classes, the sequence always branches to instruction 7, since the class is always initialized).

Lastly, the sequence of instructions described in [0054] to access a task's copy of a class's variables in cases when a class initialization barrier can be omitted for a class that is not initialization-less must be modified to support the arrangement of entries required when initialization-less classes are treated specially. The modification simply consists of changing Instruction 2 to add (TCM_POINTER_SIZE * NB_TASK_PER_TABLE) to the tcm table register instead of TCM_POINTER_SIZE in order to compute the offset to the resolved entry (TCM_POINTER_SIZE is the size of a single task class mirror object reference, NB_TASK_PER_TABLE is number of tasks supported by the table).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to efficiently realize class initialization barriers in a multitasking virtual machine, wherein class loading always takes place before class initialization, and wherein a class initialization barrier guarantees that a class is initialized before the class is first used by a program, comprising:

associating a shared runtime representation of the class with a task class mirror table that comprises at least one entry per-task, including an initialized entry, for a plurality of tasks, wherein each entry holds either a null pointer value or a non-null pointer to a task class mirror object, wherein all entries of a task mirror table that hold a non-null pointer value and that are associated with a same task hold a pointer to a same task class mirror object, wherein the task class mirror object holds a task private representation of the class for that task, wherein each task is associated with a unique integer value, wherein the unique integer value is used to compute a byte-offset from a beginning of task class mirror tables that can be used to retrieve from the initialized entry of any task class mirror table the pointer to the task class mirror object, wherein a computed byte-offset to the initialized entry is stored in a descriptor of a plurality of threads executing on behalf of a corresponding task;

using the initialized entry of a task in the task class mirror table to determine whether this task has initialized the class associated with the task class mirror table, which involves:

examining the initialized entry of the task in the task class mirror table associated with the class in order to determine if that task has initialized the class, wherein the byte-offset to the initialized entry from the beginning of the task class mirror table is obtained from the descriptor of a thread performing an examination on behalf of the task; and initializing the class by the task if the class is not already initialized, wherein a null pointer stored at the initialized entry indicates that the class has not initialized the task, wherein a non-null pointer value indicates that the class has been initialized; and accessing the task class mirror object associated to a particular task.

2. The method of claim 1, further comprising:

creating the task class mirror table and associating the task class mirror table with the shared runtime representation of the class upon creation of the shared runtime representation of the class; and setting all entries of the task class mirror table to the null pointer value.

3. The method of claim 1, further comprising:

upon completion of initialization of the class by the task, setting the initialized entry of the task class mirror table associated with the class to the task class mirror object that holds a representation of the class that is private to the task; and setting this task class mirror object to a fully initialized state.

4. The method of claim 3, wherein task class mirror tables associated with classes that have a non-empty initialization function includes one resolved entry per-task in addition to one initialized entry per-task, for the plurality of tasks.

5. The method of claim 4, wherein task class mirror tables associated with classes that have an empty initialization function include one resolved entry per-task in addition to an initialized entry per-task, for the plurality of tasks.

6. The method of claim 5, further comprising:

upon loading any class by the task, creating the task class mirror object that holds the task private representation of the class;

setting the task class mirror object's state to loaded; and assigning the task class mirror object's pointer to a resolved entry of the task class mirror table associated with the class for that task.

7. The method of claim 6, wherein the task class mirror table is arranged so that the resolved entry and the initialized entry for the task are consecutive; and wherein the byte-offset to the resolved entry can be computed from the byte-offset to the initialized entry for a same task by adding a size, expressed in number of bytes, of the pointer to the task class mirror object.

8. The method of claim 6, wherein the task class mirror table is arranged so that the resolved entry and the initialized entry for the task are separated by half of a total number of entries in the task class mirror table; and wherein the byte-offset to the resolved entry can be computed from the byte-offset to the initialized entry for a same task by adding a size, expressed in number of bytes, of half the total number of entries in the task class mirror table.

9. The method of claim 6, wherein the resolved entry of the task class mirror table associated with the class is used in cases where testing for class initialization is unneeded but access to a task-private part of the class is required when the class has been loaded but not fully initialized.

10. The method of claim 4, wherein task class mirror tables associated with classes that have an empty initialization function have a single entry per task; and wherein the single entry per task is the initialized entry for that task.

11. The method of claim 10, further comprising:

upon loading the class that has the non-empty initialization function by the task, creating the task class mirror object that holds the task private representation of the class;

setting the task class mirror object's state to loaded; and assigning the task class mirror object's pointer to a resolved entry of the task class mirror table associated with the class for that task.

12. The method of claim 11, wherein the task class mirror table is arranged so that the resolved entry and the initialized entry for the task are separated by half of a total number of entries in the task class mirror table; and wherein the byte-offset to the resolved entry can be computed from the byte-offset to the initialized entry for a same task by adding a size, expressed in number of bytes, of half the total number of entries in the task class mirror table.

13. The method of claim 12, wherein the resolved entry of task class mirror tables associated with classes that have the non-empty initialization function is used when accessing a task-private part of the class without testing for class initialization is necessary and the task has loaded but not fully initialized the class.

14. The method of claim 10, further comprising:

upon loading of the class that has the empty initialization function by the task, creating the task class mirror object that holds the task private representation of the class;

setting the task class mirror object's state to frilly initialized; and assigning the task class mirror object's pointer to the initialized entry of the task class mirror table associated with the class for that task.

15. A computer-readable tangible storage medium storing instructions that when executed by a computer cause the computer to perform a method to efficiently realize class initialization barriers in a multitasking virtual machine, wherein class loading always takes place before class initialization, and wherein a class initialization barrier guarantees that a class is initialized before the class is first used by a program, comprising:

associating a shared runtime representation of the class with a task class mirror table that comprises at least one entry per-task, including an initialized entry, for a plurality of tasks, wherein each entry holds either a null pointer value or a non-null pointer to a task class mirror object, wherein all entries of a task mirror table that hold a non-null pointer value and that are associated with a same task hold a pointer to a same task class mirror object, wherein the task class mirror object holds a task private representation of the class for that task, wherein each task is associated with a unique integer value, wherein the unique integer value is used to compute a byte-offset from a beginning of task class mirror tables that can be used to retrieve from the initialized entry of any task class mirror table the pointer to the task class mirror object, wherein a computed byte-offset to the initialized entry is stored in a descriptor of a plurality of threads executing on behalf of a corresponding task;

using the initialized entry of a task in the task class mirror table to determine whether this task has initialized the class associated with the task class mirror table; which involves:

examining the initialized entry of the task in the task class mirror table associated with the class in order to determine if that task has initialized the class, wherein the byte-offset to the initialized entry from the beginning of the task class mirror table is obtained front the descriptor of a thread performing an examination on behalf of the task; and initializing the class by the task if the class is not already initialized, wherein a null pointer stored at the initialized entry indicates that the class has not initialized the task, wherein a non-null pointer value indicates that the class has been initialized; and accessing the task class mirror object associated to a particular task.

16. The computer-readable storage medium of claim 15, the method further comprising:

creating the task class mirror table and associating the task class mirror table with the shared runtime representation of the class upon creation of the shared runtime representation of the class; and setting all entries of the task class mirror table to the null pointer value.

17. The computer-readable storage medium of claim 15, the method further comprising:

upon completion of initialization of the class by the task, setting the initialized entry of the task class mirror table associated with the class to the task class mirror object that holds a representation of the class that is private to the task; and setting this task class mirror object to a fully initialized state.

18. The computer-readable storage medium of claim 17, wherein task class mirror tables associated with classes that have a non-empty initialization function includes one resolved entry per-task in addition to one initialized entry per-task, for the plurality of tasks.

19. The computer-readable storage medium of claim 18, wherein task class mirror tables associated with classes that have an empty initialization function includes one resolved entry per-task in addition to an initialized entry per-task, for the plurality of tasks.

20. The computer-readable storage medium of claim 19, the method further comprising:

upon loading any class by the task, creating the task class mirror object that holds the task private representation of the class;

setting the task class mirror object's state to loaded; and assigning the task class mirror object's pointer to a resolved entry of the task class mirror table associated with the class for that task.

21. The computer-readable storage medium of claim 20, wherein the task class mirror table is arranged so that the resolved entry and the initialized entry for the task are consecutive; and wherein the byte-offset to the resolved entry can be computed from the byte-offset to the initialized entry for a same task by adding a size, expressed in number of bytes, of the pointer to the task class mirror object.

22. The computer-readable storage medium of claim 20, wherein the task class mirror table is arranged so that the resolved entry and the initialized entry for the task are separated by half of a total number of entries in the task class mirror table; and wherein the byte-offset to the resolved entry can be computed from the byte-offset to the initialized entry for a same task by adding a size, expressed in number of bytes, of half the total number of entries in the task class mirror table.

23. The computer-readable storage medium of claim 20, wherein the resolved entry of the task class mirror table associated with the class is used in cases where testing for class initialization is unneeded but access to a task-private part of the class is required when the class has been loaded but not fully initialized.

24. The computer-readable storage medium of claim 18, wherein task class mirror tables associated with classes that have an empty initialization function have a single entry per task; and wherein the single entry per task is the initialized entry for that task.

25. The computer-readable storage medium of claim 24, the method further comprising:

upon loading the class that has the non-empty initialization function by the task, creating the task class mirror object that holds the task private representation of the class;

setting the task class mirror object's state to loaded; and assigning the task class mirror object's pointer to a resolved entry of the task class mirror table associated with the class for that task.

26. The computer-readable storage medium of claim 25, wherein the task class mirror table is arranged so that the resolved entry and the initialized entry for the task are separated by half of a total number of entries in the task class mirror table; and wherein the byte-offset to the resolved entry can be computed from the byte-offset to the initialized entry for a same task by adding a size, expressed in number of bytes, of half the total number of entries in the task class mirror table.

27. The computer-readable storage medium of claim 26, wherein the resolved entry of task class mirror tables associated with classes that have the non-empty initialization function is used when accessing a task-private part of the class without testing for class initialization is necessary and the task has loaded but not fully initialized the class.

28. The computer-readable storage medium of claim 24, the method further comprising:

upon loading of the class that has the empty initialization function by the task, creating the task class mirror object that holds the task private representation of the class;

setting the task class mirror object's state to fully initialized; and assigning the task class mirror object's pointer to the initialized entry of the task class mirror table associated with the class for that task.

29. An apparatus to efficiently realize class initialization barriers in a multitasking virtual machine, wherein class loading always takes place before class initialization, and wherein a class initialization barrier guarantees that a class is initialized before the class is first used by a program, comprising:

an associating mechanism that is configured to associated a shared runtime representation of the class with a task class mirror table that comprises at least one entry per-task, including an initialized entry, for a plurality of tasks, wherein each entry holds either a null pointer value or a non-null pointer to a task class mirror object, wherein all entries of a task mirror table that hold a non-null pointer value and that are associated with a same task hold a pointer to a same task class mirror object, wherein the task class mirror object holds a task private representation of the class for that task, wherein each task is associated with a unique integer value, wherein the unique integer value is used to compute a byte-offset from a beginning of task class mirror tables that can be used to retrieve from the initialized entry of any task class mirror table the pointer to the task class mirror object, wherein a computed byte-offset to the initialized entry is stored in a descriptor of a plurality of threads executing on behalf of a corresponding task;

a determining mechanism that is configured to use the initialized entry of a task in the task class mirror table to determine whether this task has initialized the class associated with the task class mirror table, which involves:

examining the initialized entry of the task in the task class mirror table associated with the class in order to determine if that task has initialized the class, wherein the byte-offset to the initialized entry from the beginning of the task class mirror table is obtained from the descriptor of a thread performing an examination on behalf of the task; and initializing the class by the task if the class is not already initialized, wherein a null Pointer stored at the initialized entry indicates that the class has not initialized the task, wherein a non-null pointer value indicates that the class has been initialized; and an accessing mechanism that is configured to access the task class mirror object associated to a particular task.

30. The apparatus of claim 29, further comprising:

a creating mechanism that is configured to create the task class mirror table and associating the task class mirror table with the shared runtime representation of the class upon creation of the shared runtime representation of the class; and a setting mechanism that is configured to set all entries of the task class mirror table to the null pointer value.

31. The apparatus of claim 29, wherein the setting mechanism is further configured to set the initialized entry of the task class mirror table associated with the class to the task class mirror object that holds a representation of the class that is private to the task; and wherein the setting mechanism is further configured to set this task class mirror object to a fully initialized state.

32. The apparatus of claim 31, wherein task class mirror tables associated with classes that have a non-empty initialization function includes one resolved entry per-task in addition to one initialized entry per-task, for the plurality of tasks.

33. The apparatus of claim 32, wherein task class mirror tables associated with classes that have an empty initialization function includes one resolved entry per-task in addition to an initialized entry per-task, for the plurality of tasks.

34. The apparatus of claim 33, wherein the creating mechanism is further configured to create the task class mirror object that holds the task private representation of the class;

wherein the setting mechanism is further configured to set the task class mirror object's state to loaded; and further comprising an assigning mechanism that is configured to assign the task class mirror object's pointer to a resolved entry of the task class mirror table associated with the class for that task.

35. The apparatus of claim 34, wherein the task class mirror table is arranged so that the resolved entry and the initialized entry for the task are consecutive; and wherein the byte-offset to the resolved entry can be computed from the byte-offset to the initialized entry for a same task by adding a size, expressed in number of bytes, of the pointer to the task class mirror object.

36. The apparatus of claim 34, wherein the task class mirror table is arranged so that the resolved entry and the initialized entry for the task are separated by half of a total number of entries in the task class mirror table; and wherein the byte-offset to the resolved entry can be computed from the byte-offset to the initialized entry for a same task by adding a size, expressed in number of bytes, of half the total number of entries in the task class mirror table.

37. The apparatus of claim 34, wherein the resolved entry of the task class mirror table associated with the class is used in cases where testing for class initialization is unneeded but access to a task-private part of the class is required when the class has been loaded but not fully initialized.

38. The apparatus of claim 32, wherein task class mirror tables associated with classes that have an empty initialization function have a single entry per task; and wherein the single entry per task is the initialized entry for that task.

39. The apparatus of claim 38, wherein the creating mechanism is further configured to create the task class mirror object that holds the task private representation of the class;

wherein the setting mechanism is further configured to set the task class mirror object's state to loaded; and further comprising an assigning mechanism that is configured to assign the task class mirror object's pointer to a resolved entry of the task class mirror table associated with the class for that task.

40. The apparatus of claim 39, wherein the task class mirror table is arranged so that the resolved entry and the initialized entry for the task are separated by half of a total number of entries in the task class mirror table; and wherein the byte-offset to the resolved entry can be computed from the byte-offset to the initialized entry for a same task by adding a size, expressed in number of bytes, of half the total number of entries in the task class mirror table.

41. The apparatus of claim 40, wherein the resolved entry of task class mirror tables associated with classes that have the non-empty initialization function is used when accessing a task-private part of the class without testing for class initialization is necessary and the task has loaded but not fully initialized the class.

42. The apparatus of claim 38, wherein the creating mechanism is further configured to create the task class mirror object that holds the task private representation of the class;

wherein the setting mechanism is further configured to set the task class mirror object's state to fully initialized; and further comprising an assigning mechanism that is configured to assign the task class mirror object's pointer to the initialized entry of the task class mirror table associated with the class for that task.

* * * * *

UNITED STATES PATENT AND TRADEMARK OFFICE
CERTIFICATE OF CORRECTION

PATENT NO. : 7,003,768 B2
DATED : February 21, 2006
INVENTOR(S) : Laurent P. Daynes et al.

It is certified that error appears in the above-identified patent and that said Letters Patent is hereby corrected as shown below:

Column 12,
Line 22, delete "frilly" and replace with -- fully --.

Signed and Sealed this

Twenty-fifth Day of April, 2006

JON W. DUDAS
*Director of the United States Patent and Trademark Office*